No. 778,478. Patented December 27, 1904.

UNITED STATES PATENT OFFICE.

KARL ELBEL, OF BIEBRICH, GERMANY, ASSIGNOR TO THE FIRM OF KALLE AND COMPANY, OF BIEBRICH, GERMANY.

BLUE SULFUR DYE AND PROCESS OF MAKING SAME.

SPECIFICATION forming part of Letters Patent No. 778,478, dated December 27, 1904.

Application filed October 5, 1904. Serial No. 227,292.

*To all whom it may concern:*

Be it known that I, KARL ELBEL, a subject of the King of Prussia, Emperor of Germany, residing at Biebrich, Germany, have invented certain new and useful Improvements in the Manufacture of Blue Sulfur Dyes, of which the following is a specification.

In my application for United States Letters Patent bearing the same date I have described the mode of preparing a new monochloro-alpha-naphthol. I have now found that this monochloro-alpha-naphthol yields indophenols when oxidized in presence of a molecular proportion of a para diamin of the benzene series or of an unsymmetrical alkyl derivative of the same. These indophenols or the phenylnaphthylamin derivatives obtained by reducing the same yield valuable violet to greenish-blue sulfur colors dyeing unmordanted cotton when heated with alkali polysulfids.

In the following I give an example according to which the coloring-matters may be obtained; but my invention is not limited to the proportions and other conditions mentioned therein.

Thirty-six kilos monochloro-alpha-naphthol and 27.2 kilos dimethyl-paraphenylenediamin, $(CH_3)_2NC_6H_4NH_2$, are dissolved with twenty-four kilos of caustic-soda lye of 40° Beaumé in two thousand liters water. The solution is well cooled and mixed with a hypochlorite solution containing 29.8 kilos NaOCl. The so-obtained indophenol is filtered off, washed, and dissolved in about one thousand liters water by means of one hundred kilos crystallized sodium sulfid. The so-obtained colorless phenylnaphthylamin derivative is precipitated by the addition of eighty-five kilos bicarbonate of soda filtered and pressed. It is then mixed with two hundred kilos sodium sulfid and eighty kilos sulfur and heated gradually up to 110° centigrade, evaporizing part of the water. This temperature is maintained until the reaction is finished—*i. e.*, for about ten hours. After cooling the coloring-matter is completely separated from the aqueous part of the melt. It may be isolated by filtration and may directly be used for dyeing. It may also be purified by dissolving it in a hot solution of fifty kilos sodium sulfid in one thousand liters of water by filtering the solution and by reprecipitating the coloring-matter by means of a current of air or by the addition of common salt.

The thus-produced dyestuff is a dark-blue powder insoluble in water, soluble in alcohol with blue color, easily soluble in water in presence of sodium sulfid and dyeing unmordanted cotton from such a solution fast greenish-indigo shades.

What I claim is—

1. The manufacture of violet to greenish-blue sulfur dyes by heating with alkali polysulfids the indophenols or phenylnaphthylamin derivatives obtained by simultaneous oxidation of monochloro-alpha-naphthol and of a paradiamin of the benzene series.

2. The manufacture of a blue sulfur dye by simultaneous oxidation of monochloro-alpha-naphthol and dimethyl-paraphenylenediamin $(CH_3)_2NC_6H_4NH_2$ and by heating the so-obtained indophenol directly or after transforming it into the colorless phenylnaphthylamin derivative with alkali polysulfid.

3. The new sulfur dyes obtained by heating with alkali polysulfids the indophenols or phenylnaphthylamin derivatives produced by simultaneous oxidation of monochloro-alpha-naphthol and a paradiamin of the benzene series, which are dark-blue powders insoluble or very little soluble in water, easily soluble in an aqueous sodium-sulfid solution and dyeing from such solutions violet to greenish-blue shades on unmordanted cotton.

4. The new blue sulfur dye obtained from monochloro-alpha-naphthol and dimethyl-paraphenylenediamin substantially as described which is a dark-blue powder insoluble in water, soluble in alcohol with blue color, easily soluble in water in presence of sodium sulfid and dyeing unmordanted cotton from such a solution fast greenish-indigo shades.

In testimony whereof I have signed my name to this specification in the presence of two subscribing witnesses.

KARL ELBEL.

Witnesses:
 IGNAZ ROSENBERG,
 JEAN GRUND.